United States Patent
Mizuno

(10) Patent No.: US 10,967,919 B2
(45) Date of Patent: Apr. 6, 2021

(54) VEHICLE SIDE PORTION STRUCTURE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Koji Mizuno, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 16/360,579

(22) Filed: Mar. 21, 2019

(65) Prior Publication Data

US 2019/0300070 A1 Oct. 3, 2019

(30) Foreign Application Priority Data

Mar. 27, 2018 (JP) .............................. JP2018-060364

(51) Int. Cl.
*B62D 27/02* (2006.01)

(52) U.S. Cl.
CPC .................................. *B62D 27/023* (2013.01)

(58) Field of Classification Search
CPC .................................................... B62D 27/023
See application file for complete search history.

(56) References Cited

U.S. PATENT DOCUMENTS

2016/0023683 A1   1/2016   Nishimura et al.
2018/0265138 A1*  9/2018   Nakayama ........... B62D 27/023

FOREIGN PATENT DOCUMENTS

| EP | 2 108 568 A1 | 10/2009 |
|----|--------------|---------|
| JP | 59035273 U   | 3/1984  |
| JP | 2010-143536 A | 7/2010 |
| JP | 2011201389 A | 10/2011 |
| JP | 2015-67066 A | 4/2015  |
| JP | 201622909 A  | 2/2016  |
| WO | 2008/155871 A1 | 12/2008 |

* cited by examiner

*Primary Examiner* — D Glenn Dayoan
*Assistant Examiner* — Melissa Ann Bonifazi
(74) *Attorney, Agent, or Firm* — Sughrue Mion, PLLC

(57) ABSTRACT

A vehicle side portion structure includes an inner member and an outer member that is disposed outward of the inner member in a vehicle width direction, the inner member and the outer member being bonded to each other through spot welding. An upper corner portion of the inner member is provided with a welded portion provided with a welding point on which the spot welding is performed, and a bead portion is provided in the vicinity of the welded portion of the inner member such that the bead portion surrounds the welded portion.

3 Claims, 11 Drawing Sheets

VEHICLE SIDE PORTION STRUCTURE

TECHNICAL FIELD

The present disclosure relates to a vehicle side portion structure.

BACKGROUND

As a vehicle side portion structure in the related art, for example, a technique described in International Unexamined Patent Application No. 2008/155871 is known. In the case of the vehicle side portion structure described in International Unexamined Patent Application No. 2008/155871, a lower end portion of a center pillar inner is spot welded to a side sill stiffener, an upper end portion of the center pillar inner is spot welded to a roof side rail, a lower end portion of a center pillar stiffener lower is spot welded to the side sill stiffener, and an upper end portion of the center pillar stiffener lower is spot welded to a lower end portion of a center pillar stiffener upper.

SUMMARY

A structure in which an outer member and an inner member are spot welded to each other as in the related art has a problem as follows. That is, for example, when one of right and left sides of a vehicle body falls down while a vehicle is traveling on a bad road, an outer member is deformed outward in a vehicle width direction and an inner member is deformed inward in the vehicle width direction at the other of the right and left sides of the vehicle body. In this case, a load is input to a welding point and a crack becomes likely to be generated in an end portion of the welding point. As a result, there is a possibility that the outer member and the inner member are separated from each other.

An object of the present disclosure is to provide a vehicle side portion structure with which it is possible to suppress a crack generated in a welding point.

As a result of intensive investigations related to the endurance strength of at the time of travel on a bad road, the present inventors have found that the amount of inward deformation of an inner member in a vehicle width direction is greater than the amount of inward deformation of an outer member in the vehicle width direction when one of right and left sides of a vehicle body falls down, the outer member is deformed outward in the vehicle width direction, and the inner member is deformed inward in the vehicle width direction at the other of the right and left sides of the vehicle body and that a crack is likely to be generated in a welding point provided on an upper corner portion of the inner member in particularly. Therefore, the inventors have devised the present disclosure.

A vehicle side portion structure according to an aspect of the present disclosure includes an inner member and an outer member that is disposed outward of the inner member in a vehicle width direction, the inner member and the outer member being bonded to each other through spot welding. An upper corner portion of the inner member is provided with a welded portion provided with a welding point on which the spot welding is performed, and a bead portion is provided in the vicinity of the welded portion of the inner member such that the bead portion surrounds the welded portion.

When a vehicle in which such a vehicle side portion structure is installed travels on a bad road, the outer member is deformed outward in the vehicle width direction and the inner member is deformed inward in the vehicle width direction. However, the bead portion is provided in the vicinity of the welded portion provided on the upper corner portion of the inner member such that the bead portion surrounds the welded portion. Therefore, when the inner member is deformed inward in the vehicle width direction, the bead portion is deformed to be widened and thus a load applied to the welding point of the welded portion is reduced. Accordingly, it is possible to suppress a crack generated in the welding point.

The bead portion may be integrated with the welded portion. According to such a configuration, the bead portion is provided to be continuous with the welded portion and thus the bead portion can be provided even when a space in the vicinity of the welded portion provided on the upper corner portion of the inner member is narrow.

An edge of the welded portion may have a curved shape and the bead portion may have a curved shape extending along the edge of the welded portion. According to such a configuration, a distance from the bead portion to the welding point becomes uniform and thus a load input to the welding point in any direction is reduced evenly.

According to the present disclosure, it is possible to suppress a crack generated in a welding point.

DETAILED DESCRIPTION

Hereinafter, an embodiment of the present disclosure will be described in detail with reference to drawings.

Figure 1:
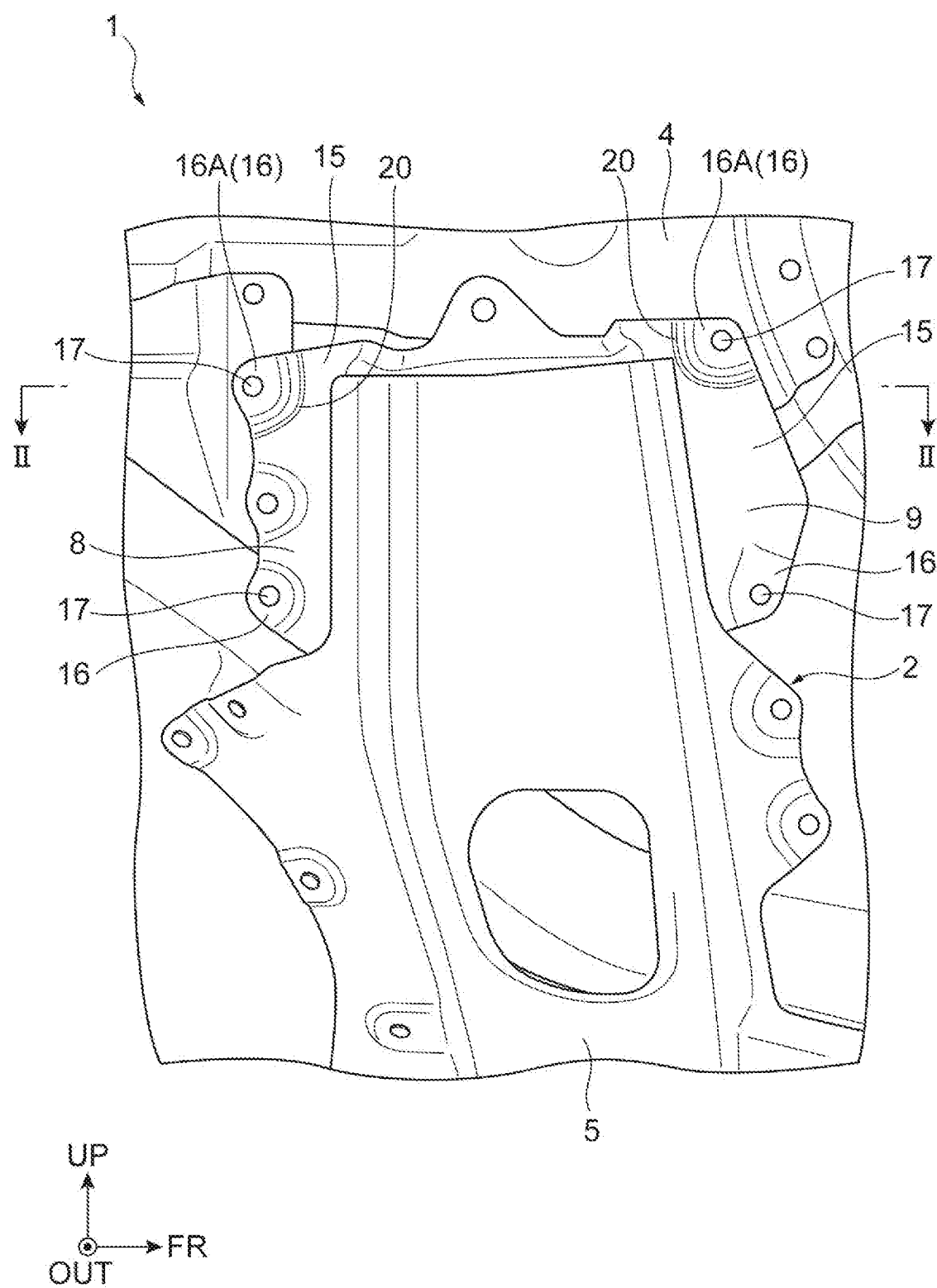
FIG. 1 is a schematic side view illustrating a rear pillar as a vehicle side portion structure according to an embodiment of the present disclosure.
Figure 2:
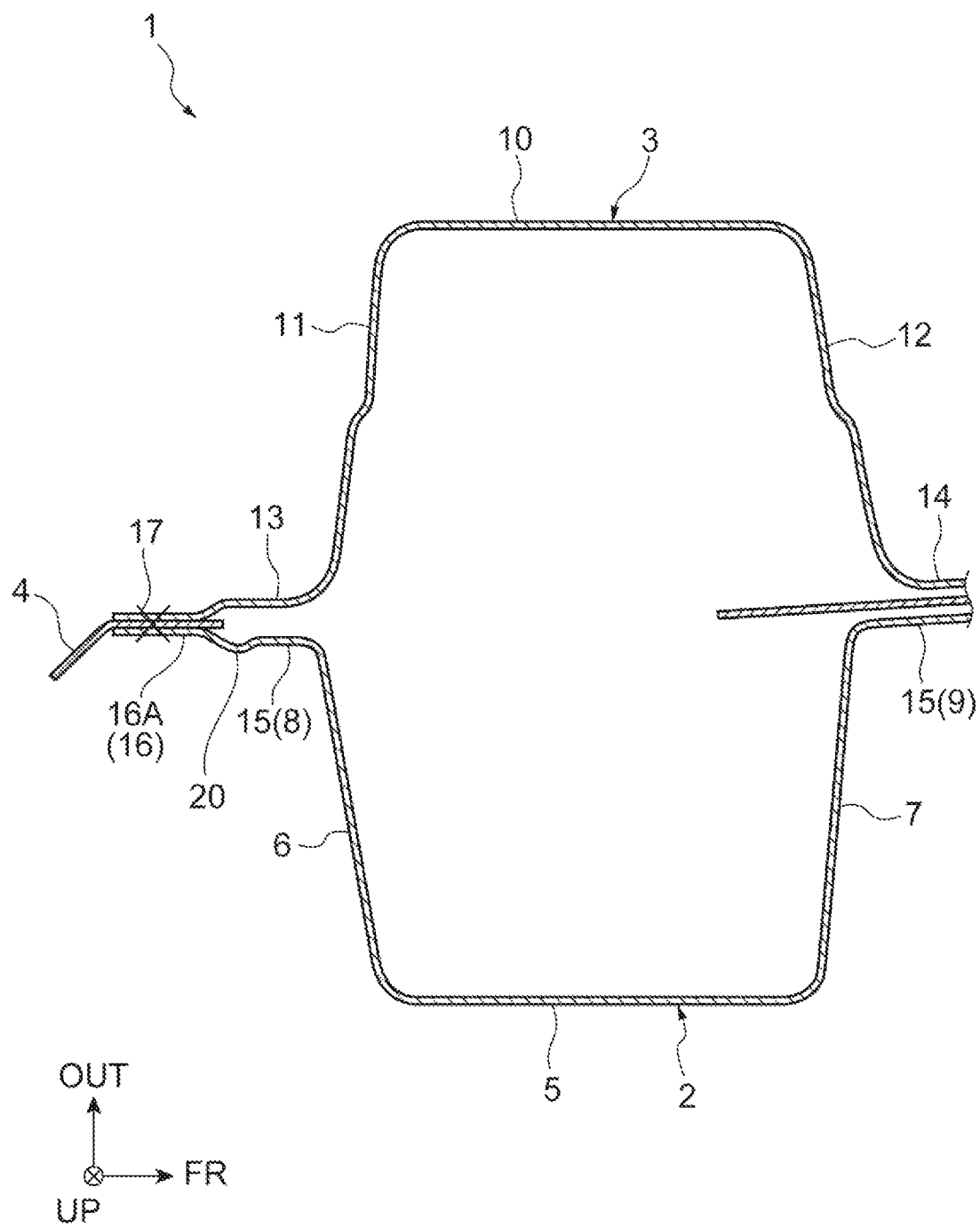
FIG. 2 is a sectional view taken along line II-II in FIG. 1.

FIG. 1 is a schematic side view illustrating a rear pillar as a vehicle side portion structure according to an embodiment of the present disclosure. FIG. 2 is a sectional view taken along line II-II in FIG. 1. In FIGS. 1 and 2, the vehicle side portion structure according to the embodiment is a rear pillar (C pillar) structure installed in a vehicle. Note that, an arrow FR in the drawings represents a front side in a vehicle body front-rear direction, an arrow UP in the drawings represents an upper side in a vehicle body height direction, and an arrow OUT in the drawings represent an outer side in a vehicle body lateral direction (vehicle width direction).

A rear pillar 1 is provided with a pillar inner 2 (inner member), a pillar outer 3 (outer member) that is disposed outward of the pillar inner 2 in the vehicle width direction, and a side inner 4 that is disposed between the pillar inner 2 and the pillar outer 3. The pillar inner 2 and the pillar outer 3 are spot welded to each other with the side inner 4 interposed therebetween. The pillar inner 2 and the pillar outer 3 form a closed section structure. The pillar inner 2, the pillar outer 3, and the side inner 4 are formed by using a steel plate.

The pillar inner 2 has an approximately hat-shaped section. The pillar inner 2 is provided with a side wall 5, a rear wall 6 that is provided to be bent outward in the vehicle width direction from a rear end of the side wall 5, a front wall 7 that is provided to be bent outward in the vehicle width direction from a front end of the side wall 5, a projecting wall 8 that is provided to be bent rearward from an outer end of the rear wall 6, and a projecting wall 9 that is provided to be bent forward from an outer end of the front wall 7.

The pillar outer 3 has an approximately hat-shaped section. The pillar outer 3 is provided with a side wall 10, a rear wall 11 that is provided to be bent inward in the vehicle width direction from a rear end of the side wall 10, a front wall 12 that is provided to be bent inward in the vehicle width direction from a front end of the side wall 10, a projecting wall 13 that is provided to be bent rearward from an inner end of the rear wall 11, and a projecting wall 14 that is provided to be bent forward from an inner end of the front wall 12.

The projecting walls 8 and 13 are bonded to each other through spot welding with the side inner 4 interposed therebetween. In addition, projecting walls 9 and 14 are bonded to each other through spot welding with the side inner 4 interposed therebetween.

Each of the projecting walls 8 and 9 is provided with a wall main body portion 15 and a plurality of welded portions 16 formed to be recessed with respect to the wall main body portion 15. Each of the welded portions 16 is provided with a welding point 17 (spot) on which spot welding is performed.

Figure 3:
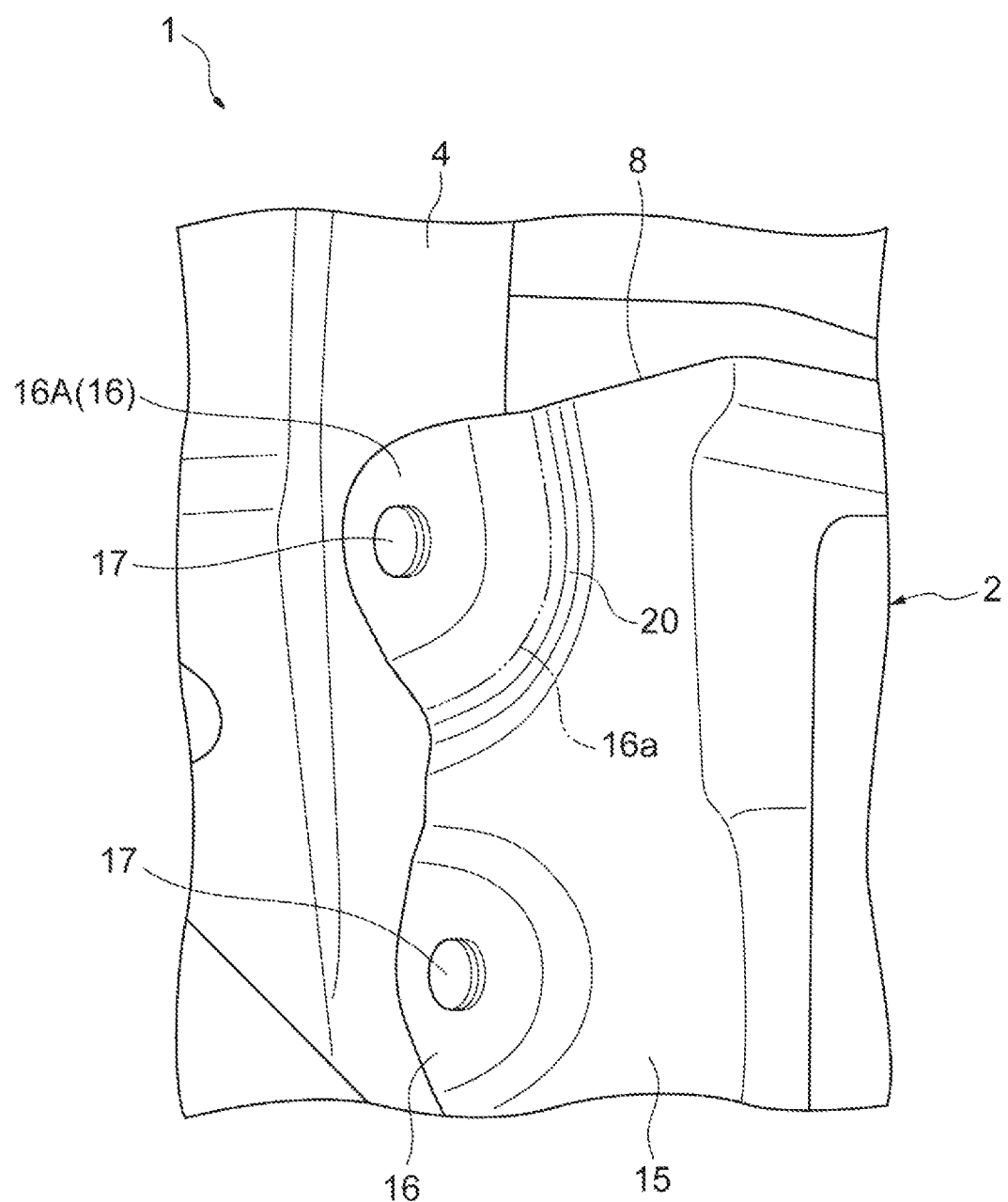
FIG. 3 is a schematic side view illustrating an upper portion of a pillar inner illustrated in FIG. 1.

One welded portion 16A from among the plurality of welded portions 16 provided on the projecting wall 8 is provided on a rear upper corner portion of the projecting wall 8, as illustrated in FIG. 3. One welded portion 16A from among the plurality of welded portions 16 provided on the projecting wall 9 is provided on a front upper corner portion of the projecting wall 9. That is, the welded portions 16A are provided on upper corner portions of the pillar inner 2. An edge 16a of the welded portion 16A has a curved shape. Note that, the edge 16a of the welded portion 16A is illustrated by a virtual line (two-dot chain line).

Figure 4:
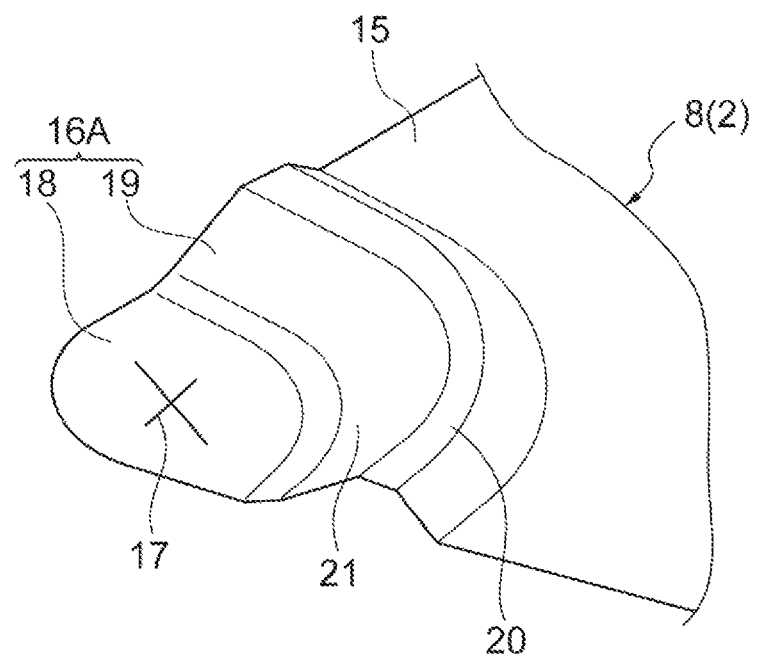
FIG. 4 is an enlarged perspective view illustrating an upper corner portion of the pillar inner illustrated in FIG. 3.
Figure 5:
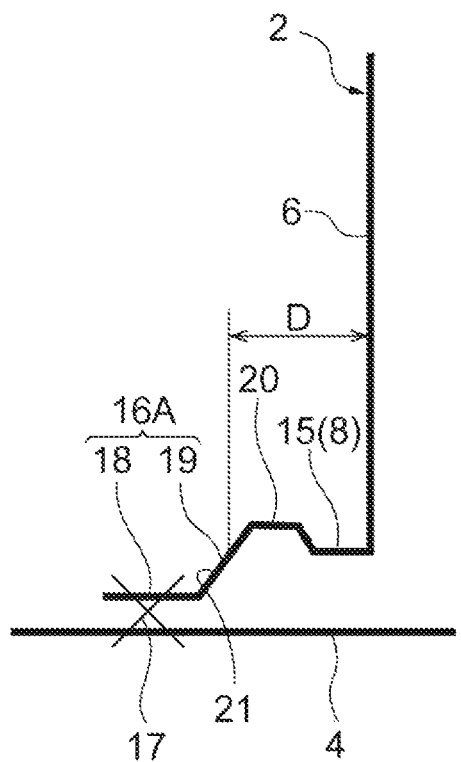
FIG. 5 is a sectional view illustrating the upper corner portion of the pillar inner illustrated in FIG. 4.

As illustrated in FIGS. 4 and 5, the welded portion 16A is configured of a seat surface portion 18 that comes into contact with the side inner 4 and a level difference portion 19 that is provided to connect the seat surface portion 18 and the wall main body portion 15 to each other. The level difference portion 19 is formed to be inclined. The welding point 17 is provided on the seat surface portion 18.

In the vicinity of the welded portion 16A of the wall main body portion 15 of the pillar inner 2, a protruding bead portion 20 is provided to surround the welded portion 16A.

The bead portion 20 is integrated with the welded portion 16A. Specifically, the bead portion 20 is integrally provided with the level difference portion 19 of the welded portion 16A. Accordingly, a portion of the bead portion 20 forms an inclined surface 21 together with the level difference portion 19. In addition, the bead portion 20 has a curved shape extending along the edge 16a of the welded portion 16A.

Figure 6A:
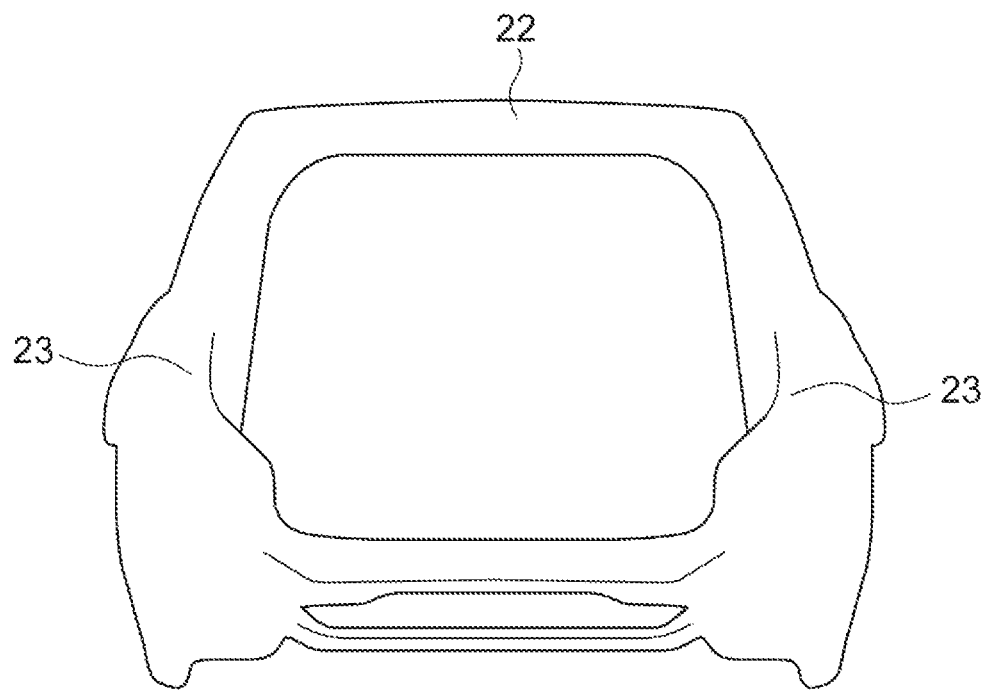
FIG. 6A is a schematic front view illustrating the way in which a vehicle side portion is deformed when a vehicle travels on a bad road.
Figure 6B:
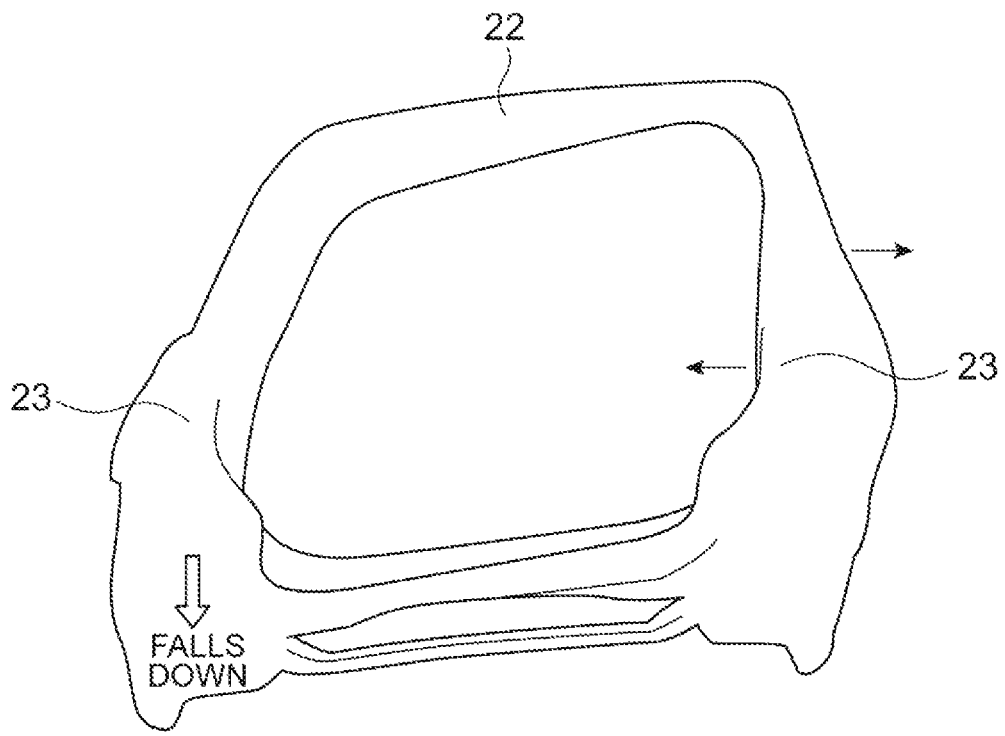
FIG. 6B is a schematic front view illustrating the way in which a vehicle side portion is deformed when a vehicle travels on a bad road.

Meanwhile, according to a test related to the endurance strength of a vehicle at the time of travel on a bad road, a vehicle body 22 is deformed into an approximately rhombic shape as illustrated in FIGS. 6A and 6B when traveling on a bad road. Specifically, when one of right and left sides of the vehicle body 22 falls down, an outer side of a rear pillar 23 is pulled outward in the vehicle width direction and an inner side of the rear pillar 23 is pulled inward in the vehicle width direction at the other of the right and left sides of the vehicle body 22.

Figure 7:
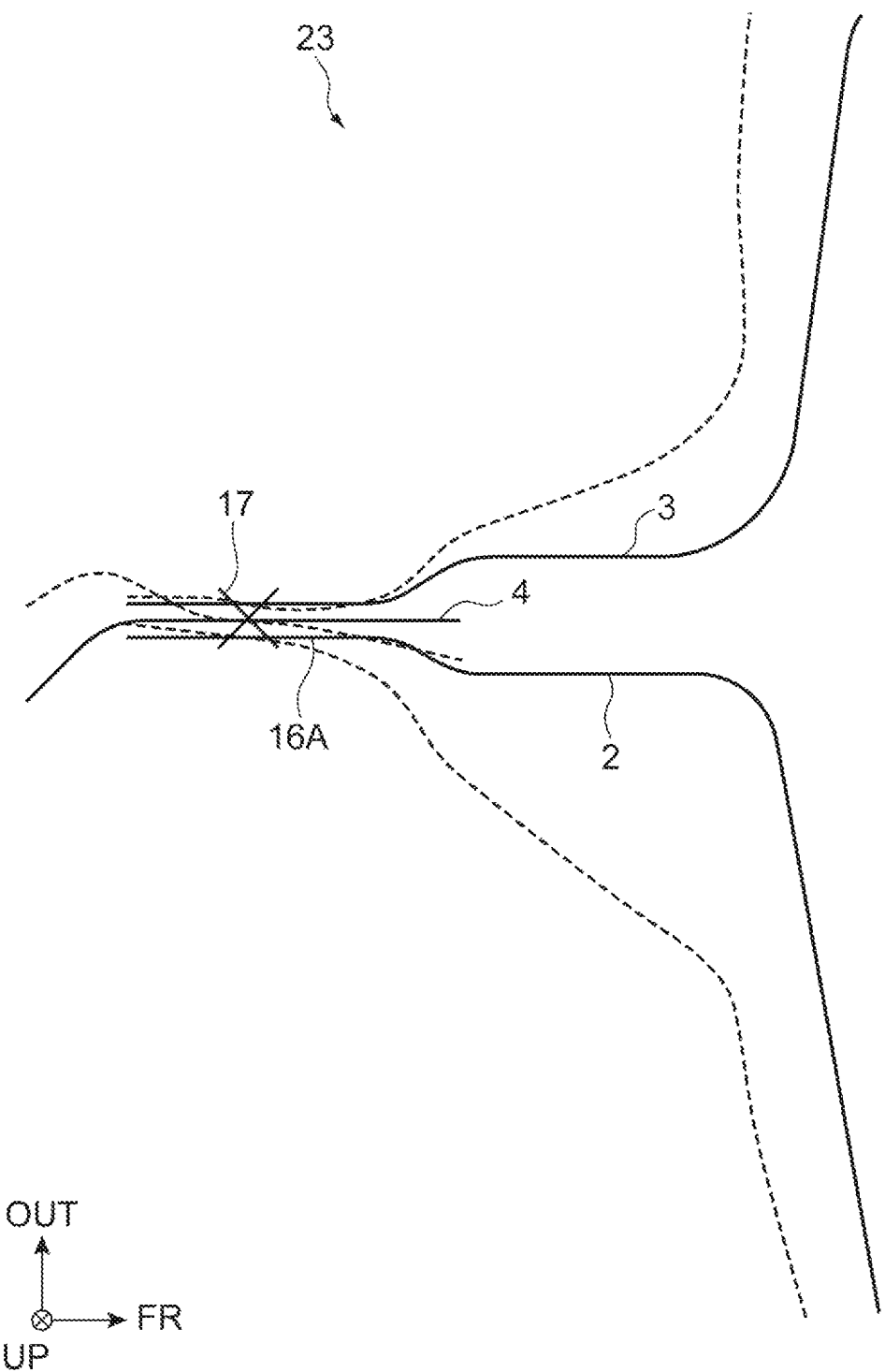
FIG. 7 is a sectional view illustrating the way in which a pillar inner and a pillar outer are deformed when the vehicle travels on a bad road.

Therefore, as illustrated in FIG. 7, the pillar outer 3 of the rear pillar 23 is deformed outward in the vehicle width direction and the pillar inner 2 of the rear pillar 23 is deformed inward in the vehicle width direction. It has been demonstrated that the amount of deformation of the pillar inner 2 is larger than the amount of deformation of the pillar outer 3 at this time. Note that, in FIG. 7, a solid line represents a state before the deformation and a broken line represents a state after the deformation.

Figure 8:
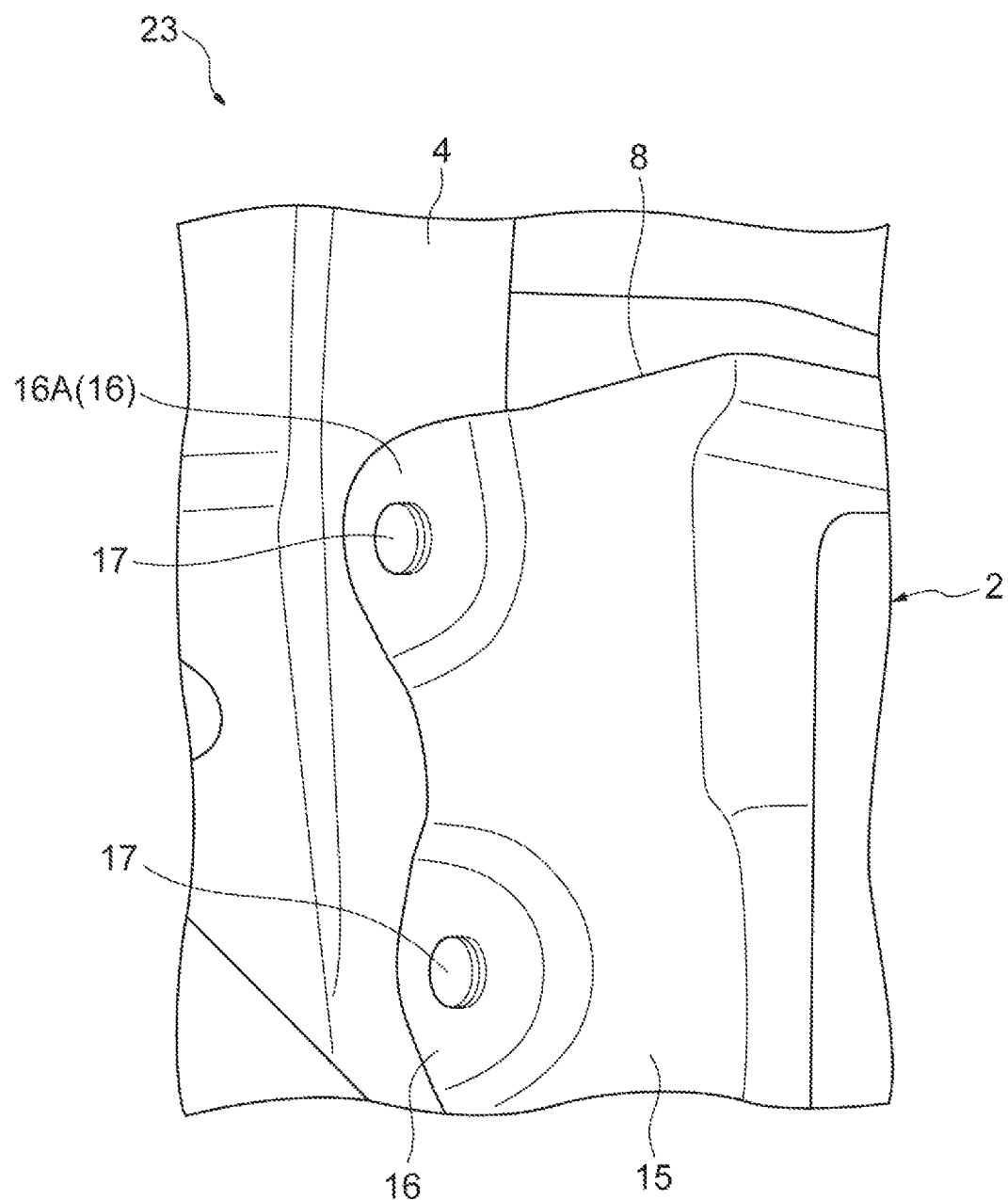
FIG. 8 is a schematic side view illustrating an upper portion of a pillar inner according to a modification example.

Here, as illustrated in FIG. 8, if no bead portion 20 is provided in the vicinity of the welded portion 16A of the wall main body portion 15 of the pillar inner 2, a load is applied to the welding point 17 of the welded portion 16A due to deformation of the pillar inner 2 and the pillar outer 3 and a crack is likely to be generated in an end portion of the welding point 17. As a result, there is a possibility that the pillar inner 2 and the pillar outer 3 are separated from each other at the welding point 17 of the welded portion 16A.

Figure 9:
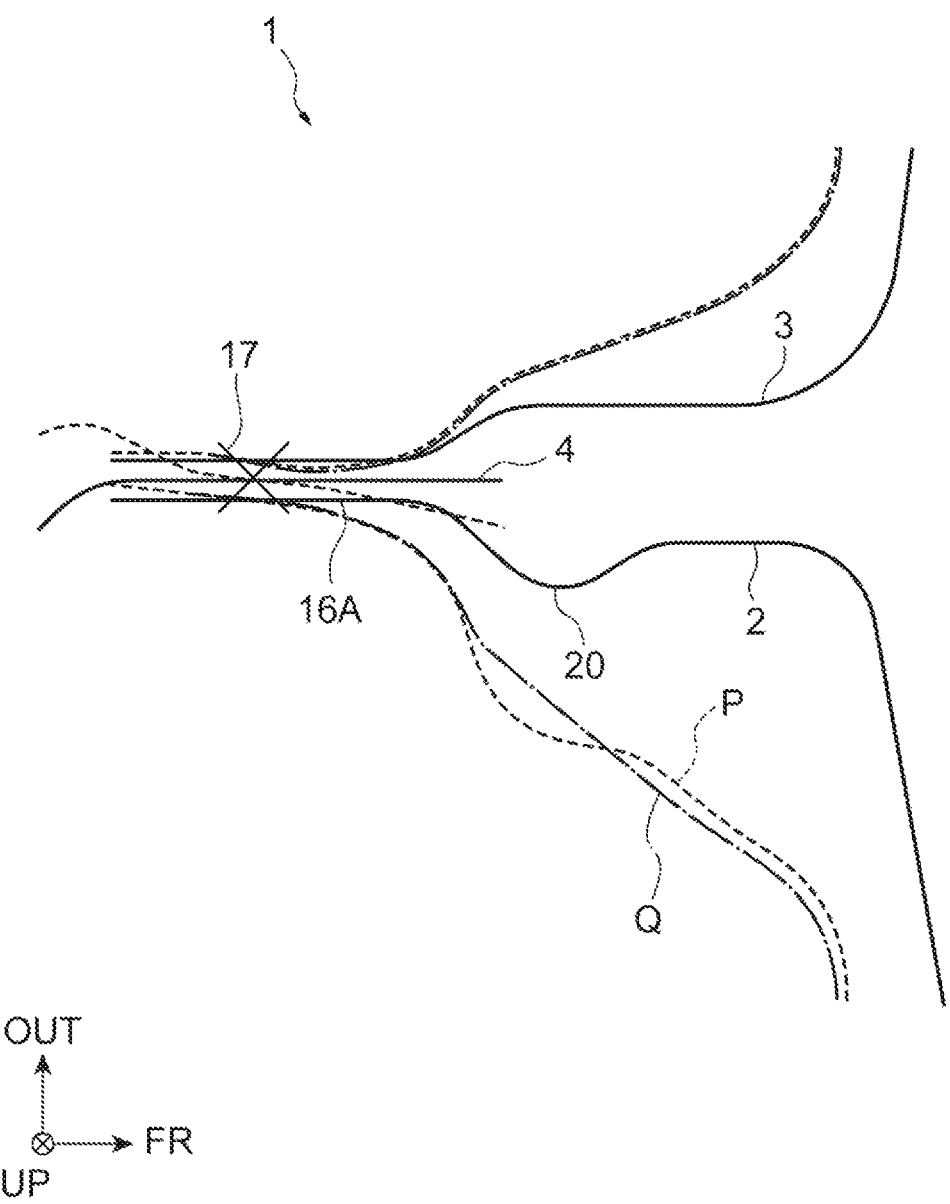
FIG. 9 is a sectional view illustrating the way in which the pillar inner and a pillar outer illustrated in FIG. 2 are deformed.

With regard to such a problem, in the case of the rear pillar 1 of the present embodiment, the bead portion 20 is provided in the vicinity of the welded portion 16A of the wall main body portion 15 of the pillar inner 2 such that the bead portion 20 surrounds the welded portion 16A. Therefore, when the pillar outer 3 is deformed outward in the vehicle width direction and the pillar inner 2 is deformed inward in the vehicle width direction, the bead portion 20 is deformed to be widened as illustrated by a broken line P in FIG. 9. Therefore, in comparison with a case where the bead portion 20 is not provided (refer to one-dot chain line Q), the amount of deformation of the pillar inner 2 becomes small. Accordingly, a load applied to the welding point 17 of the welded portion 16A is reduced and thus a crack is less likely to be generated in an end portion of the welding point 17. Therefore, it is possible to prevent the pillar inner 2 and the pillar outer 3 from being separated from each other at the welding point 17 of the welded portion 16A.

Figure 10:
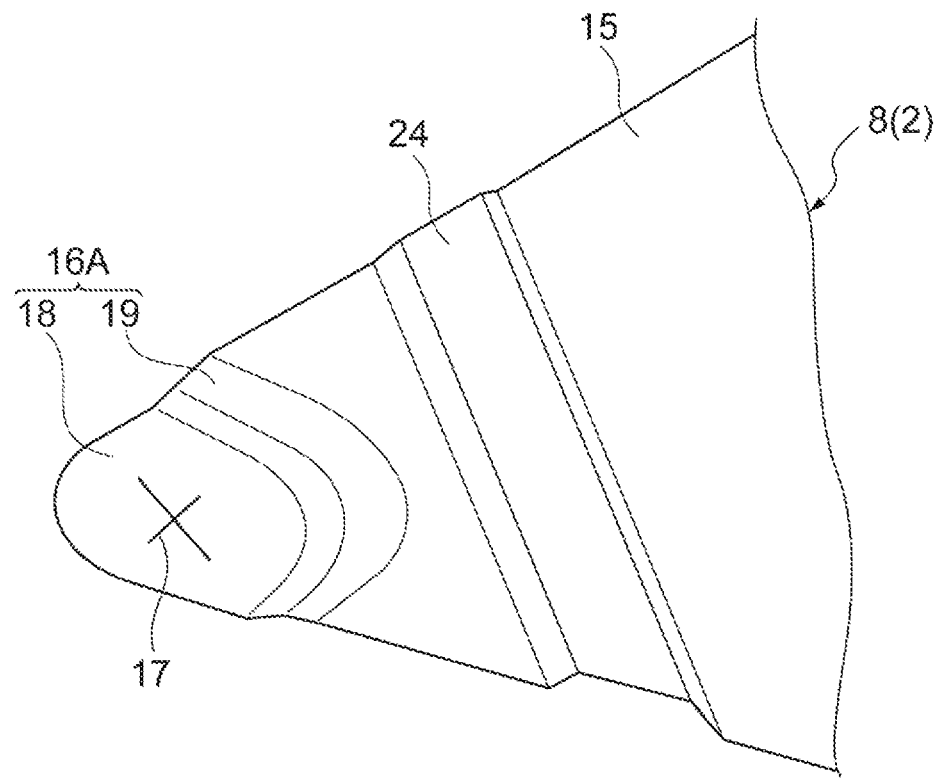
FIG. 10 is an enlarged perspective view illustrating an upper corner portion of a pillar inner according to another modification example.
Figure 11:
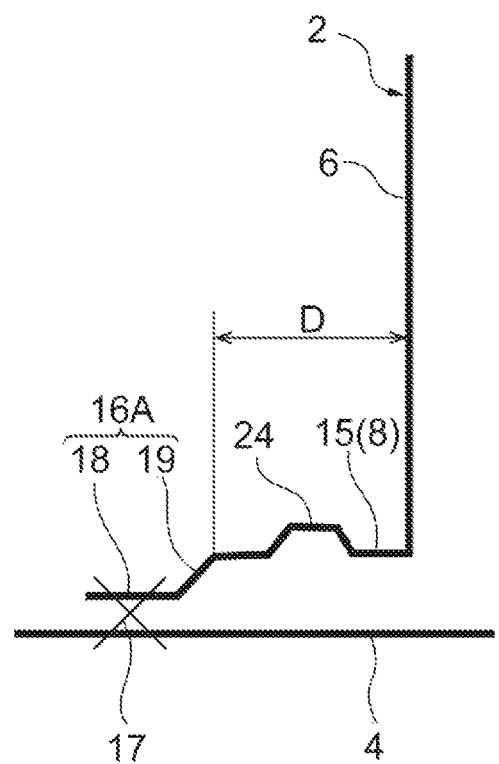
FIG. 11 is a sectional view of the upper corner portion of the pillar inner illustrated in FIG. 10.

In addition, it is also conceivable to provide a straight bead portion 24 in the vicinity of the welded portion 16A of the wall main body portion 15 of the pillar inner 2, as illustrated in FIG. 10. However, in this case, a distance from the bead portion 24 to the welding point 17 of the welded portion 16A increases toward a longitudinal end portion of the bead portion 24. Therefore, as illustrated in FIG. 11, in order to provide the bead portion 24 on the projecting wall 8 of the pillar inner 2, a distance D from the welded portion 16A of the projecting wall 8 to the rear wall 6 needs to be long. That is, when the distance D from the welded portion 16A of the projecting wall 8 to the rear wall 6 is short, the bead portion 24 cannot be provided.

Meanwhile, in the case of the rear pillar 1 of the present embodiment, the bead portion 20 has a curved shape extending along the edge 16a of the welded portion 16A and is integrated with the welded portion 16A. Therefore, the bead portion 20 is provided to be continuous with the welded portion 16A. Accordingly, as illustrated in FIG. 5, even when the distance D from the welded portion 16A of the projecting wall 8 to the rear wall 6 is short, the bead portion 20 can be provided.

According to the present embodiment, as described above, the bead portion 20 is provided in the vicinity of the welded portion 16A provided on the upper corner portion of the pillar inner 2 such that the bead portion 20 surrounds the welded portion 16A. Therefore, when the pillar inner 2 is deformed inward in the vehicle width direction at the time of travel on a bad road, the bead portion 20 is deformed to be widened and thus a load applied to the welding point 17 of the welded portion 16A is reduced. Therefore, it is possible to suppress a crack generated in the welding point 17. As a result, it is possible to prevent the pillar inner 2 and the pillar outer 3 from being separated from each other without increasing the thicknesses of the pillar inner 2 and the pillar outer 3.

In addition, in the present embodiment, the bear portion 20 is integrated with the welded portion 16A. According to such a configuration, the bead portion 20 is provided to be continuous with the welded portion 16A and thus the bead portion 20 can be provided even when a space in the vicinity of the welded portion 16A provided on the upper corner portion of the pillar inner 2 is narrow.

In addition, in the present embodiment, the bead portion 20 has a curved shape extending along the edge 16a of the welded portion 16A. According to such a configuration, a distance from the bead portion 20 to the welding point 17 of the welded portion 16A becomes uniform and thus a load input to the welding point 17 in any direction is reduced evenly.

Note that, the present disclosure is not limited to the above-described embodiment. For example, in the above-described embodiment, the bead portion 20 is integrated with the welded portion 16A. However, the present disclosure is not particularly limited to the embodiment and the bead portion 20 may not be integrated with the welded portion 16A as long as the bead portion 20 is provided in the vicinity of the welded portion 16A such that the bead portion 20 surrounds the welded portion 16A. Specifically, the bead portion 20 may be provided on the wall main body portion 15 of the pillar inner 2 as a whole. In this case, the welded portion 16A and the bead portion 20 are formed in a stepped shape.

In addition, in the above-described embodiment, the bead portion 20 has a curved shape extending along the edge 16a of the welded portion 16A. However, the present disclosure is not particularly limited to the embodiment and the bead portion 20 may not have a curved shape as long as the bead portion 20 is provided in the vicinity of the welded portion 16A such that the bead portion 20 surrounds the welded portion 16A.

In addition, in the above-described embodiment, the side inner 4 is disposed between the pillar inner 2 and the pillar outer 3. However, such a side inner 4 may not be provided.

Furthermore, the vehicle side portion structure in the above-described embodiment is a structure for the rear pillar 1. However, the present disclosure is not particularly limited to the rear pillar 1 and can be applied to a front pillar (A pillar) or a center pillar (B pillar). In addition, the present disclosure also can be applied to a vehicle body side portion other than a pillar such as a side panel or the like as long as an outer member and an inner member are provided.

What is claimed is:

1. A vehicle side portion structure which includes an inner member and an outer member that is disposed outward of the inner member in a vehicle width direction, the inner member and the outer member being bonded to each other through spot welding,
    wherein an upper corner portion of the inner member is provided with a welded portion provided with a welding point which the inner member and the outer member are bonded to each other through spot welding,
    wherein a bead portion is provided in a vicinity of the welded portion of the inner member such that the bead portion surrounds the welded portion, and
    wherein an end portion of the bead portion is in contact with an end portion of the upper corner portion of the inner member.

2. The vehicle side portion structure according to claim 1, wherein the bead portion is integrated with the welded portion.

3. The vehicle side portion structure according to claim 1, wherein an edge of the welded portion has a curved shape, and
    wherein the bead portion has a curved shape extending along the edge of the welded portion.

* * * * *